United States Patent
Xu

(10) Patent No.: US 11,777,308 B2
(45) Date of Patent: Oct. 3, 2023

(54) SURGE PROTECTION CIRCUIT, LIGHTNING PROTECTOR AND ELECTRONIC DEVICE

(71) Applicant: Anker Innovations Technology Co., Ltd., Changsha (CN)

(72) Inventor: Lixing Xu, Shenzhen (CN)

(73) Assignee: Anker Innovations Technology Co., Ltd., Changsha (CN)

( * ) Notice: Subject to any disclaimer, the term of this patent is extended or adjusted under 35 U.S.C. 154(b) by 0 days.

(21) Appl. No.: 17/318,403

(22) Filed: May 12, 2021

(65) Prior Publication Data
US 2022/0021204 A1    Jan. 20, 2022

(51) Int. Cl.
| | | |
|---|---|---|
| *H02H 9/04* | (2006.01) | |
| *H02H 3/02* | (2006.01) | |
| *H02H 3/22* | (2006.01) | |
| *H01C 7/12* | (2006.01) | |
| H01C 8/04 | (2006.01) | |
| H02H 3/20 | (2006.01) | |

(52) U.S. Cl.
CPC .............. *H02H 9/042* (2013.01); *H01C 7/12* (2013.01); *H02H 3/02* (2013.01); *H02H 3/22* (2013.01); *H01C 8/04* (2013.01); *H02H 3/20* (2013.01); *H02H 9/04* (2013.01)

(58) Field of Classification Search
CPC ............ H02H 9/04; H02H 9/06; H02H 9/042; H02H 9/046; H02H 9/00; H02H 3/02; H02H 3/22; H02H 5/04; H01C 7/12; H01C 8/04
USPC .......................................... 361/91.1, 117–120
See application file for complete search history.

(56) References Cited

U.S. PATENT DOCUMENTS

| | | | | |
|---|---|---|---|---|
| 5,999,391 A | * | 12/1999 | Lou .................. | H02H 9/042 361/111 |
| 6,778,375 B1 | * | 8/2004 | Hoopes ............. | H02H 9/042 361/120 |
| 9,735,725 B2 | * | 8/2017 | Clendenen ........ | H02H 7/1222 |

(Continued)

FOREIGN PATENT DOCUMENTS

| | | |
|---|---|---|
| CN | 202474851 U | 10/2012 |
| CN | 103618286 A | 3/2014 |
| CN | 206211524 U | 5/2017 |

(Continued)

OTHER PUBLICATIONS

Feb. 11, 2022—(CN) Office Action of 202010688284.3, 11 pages.

*Primary Examiner* — Danny Nguyen
(74) *Attorney, Agent, or Firm* — Banner & Witcoff, Ltd.

(57) ABSTRACT

The present application provides a surge protection circuit, a lightning protector and an electronic device. The surge protection circuit includes a first protection module, the first protection module comprises a first protection sub-module and a second protection sub-module electrically connected to the first protection sub-module. The first protection sub-module is used for surge protection during a first surge input, the second protection sub-module is used for surge protection during a second surge input protection, and the second surge strength is higher than the strength of the first surge. The surge protection circuit, lightning protection and electronic equipment could provide different levels of surge protection for different levels of surge and could greatly enhance the sensitivity of lightning protection.

20 Claims, 10 Drawing Sheets

(56) References Cited

U.S. PATENT DOCUMENTS

2003/0086225 A1* 5/2003 Chaudhry .............. H02H 5/105
361/91.1
2005/0122655 A1* 6/2005 Hotchkiss .............. H02H 9/044
361/103

FOREIGN PATENT DOCUMENTS

| CN | 109245077 A | 1/2019 |
| CN | 106451344 B | 8/2019 |
| CN | 110679053 A | 1/2020 |
| WO | 9748159 A1 | 12/1997 |

* cited by examiner

SURGE PROTECTION CIRCUIT, LIGHTNING PROTECTOR AND ELECTRONIC DEVICE

CROSS REFERENCE TO RELATED APPLICATION

This application claims priority to Chinese Application No. 202010688284.3, filed on 2020 Jul. 16. The entire disclosures of the above application are incorporated herein by reference.

BACKGROUND OF INVENTION

Field of Invention

This application relates to the technical field of lightning protection, and more specifically to a surge protection circuit, a lightning protector and an electronic device.

Technique of the Prior Art

Lightning protector is an electronic device that provides safety protection for various electronic devices, instruments, and communication lines. When the electrical circuit or communication line suddenly generate spike current or voltage because of external interference, the lightning protector can shunt in a very short period of time to avoid damage to other equipment.

The existing lightning protector generally includes a thermal cutoff and a varistor. When a fire line input port and a zero line input port input normal voltage, the varistor maintain a high resistance state for normal transmission of electrical energy to the power equipment. When a transient surge input from the fire line input port and zero line input port and reach a voltage threshold of the varistor, the varistor changed to a low resistance state, electrical energy will be released from the fire line input port to the zero line input port through the thermal cutoff, which will clamp the input voltage to a normal range and protect the safety of the circuit and the power equipment. Such a lightning protector includes only one level of lightning protection structure, response sensitivity of the lightning protection is low, and the lightning protector itself is easy to be damaged.

SUMMARY OF INVENTION

The present application has been filed to solve at least one of the above problems. According to an aspect of the present application, a surge protection circuit is provided. The surge protection circuit includes a first protection module, the first protection module comprises a first protection sub-module and a second protection sub-module electrically connected to the first protection sub-module. The first protection sub-module is used for surge protection during a first surge input, the second protection sub-module is used for surge protection during a second surge input protection, and the second surge strength is higher than the strength of the first surge.

In an embodiment of the current application, the first protection module further comprises a switching sub-module electrically connected to the second protection sub-module, the switching sub-module is used to switch to the second protection sub-module for surge protection when the second surge input.

In an embodiment of the present application, the first protection sub-module and the second protection sub-module are connected in series with each other.

In an embodiment of the present application, the switching sub-module is connected in parallel with the second protection sub-module.

In an embodiment of the present application, the switching sub-module comprises a current fuse, the current fuse is configured to fuse when second surge input.

In an embodiment of the present application, the first protection sub-module comprises a first varistor, the second protection sub-module comprises a thermal cutoff and a second varistor connected in series with each other, the first varistor is connected in series with the second varistor when the second surge input.

In an embodiment of the present application, the surge protection circuit further comprises: a second protection module electrically connected to the first protection module, the second protection module is used to protect the surge protection circuit and an electrical equipment connected to the surge protection circuit.

In an embodiment of the present application, the first protection sub-module and the second protection sub-module are connected in series with each other.

In an embodiment of the present application, the second protection module further comprises a clamping sub-module, the clamping sub-module comprising a first diode, the first diode is a voltage regulator diode or a transient diode.

In an embodiment of the present application, the clamping sub-module further comprises a second diode, the second diode being a voltage regulator diode or a transient diode, the first diode forming a bidirectional transient diode with the second diode.

In an embodiment of the present application, the surge protection circuit further comprises an indication module, the indication module is used to indicate the operating status of the first protection module and/or the second protection module.

According to another aspect of the present application, a lightning protector is provided, the lightning protector comprising a surge protection circuit as described above.

According to a further aspect of the present application, an electronic device is provided, the electronic device comprising a surge protection circuit as described above.

In an embodiment of the present application, the electronic device is a socket and the surge protection circuit is provided between a power input port and a power output port.

The surge protection circuit, lightning protection and electronic equipment could provide different levels of surge protection for different levels of surge and could greatly enhance the sensitivity of lightning protection.

BRIEF DESCRIPTION OF DRAWINGS

The foregoing and other objects, features and advantages of the present application will become more apparent by a more detailed description of embodiments of the present application in connection with the accompanying drawings. The accompanying drawings are used to provide further understanding of the embodiments of this application and form part of the specification and, together with the embodiments of this application, are used to explain this application and do not constitute a limitation of this application. In the accompanying drawings, same reference marks usually represent same parts or steps.

DETAILED DESCRIPTION OF PREFERRED EMBODIMENTS

In order to make the object, technical solutions and advantages of the present application more apparent, the following exemplary embodiments according to the present application will be described in detail with reference to the accompanying drawings. It is clear that the described embodiments are only a portion of the embodiments of the present application and not all of the embodiments of the present application, and it should be understood that the present application is not limited by the example embodiments described herein. Based on the embodiments of this application described in this application, all other embodiments obtained by a person skilled in the art without creative labor shall fall within the scope of protection of this application.

Figure 1:
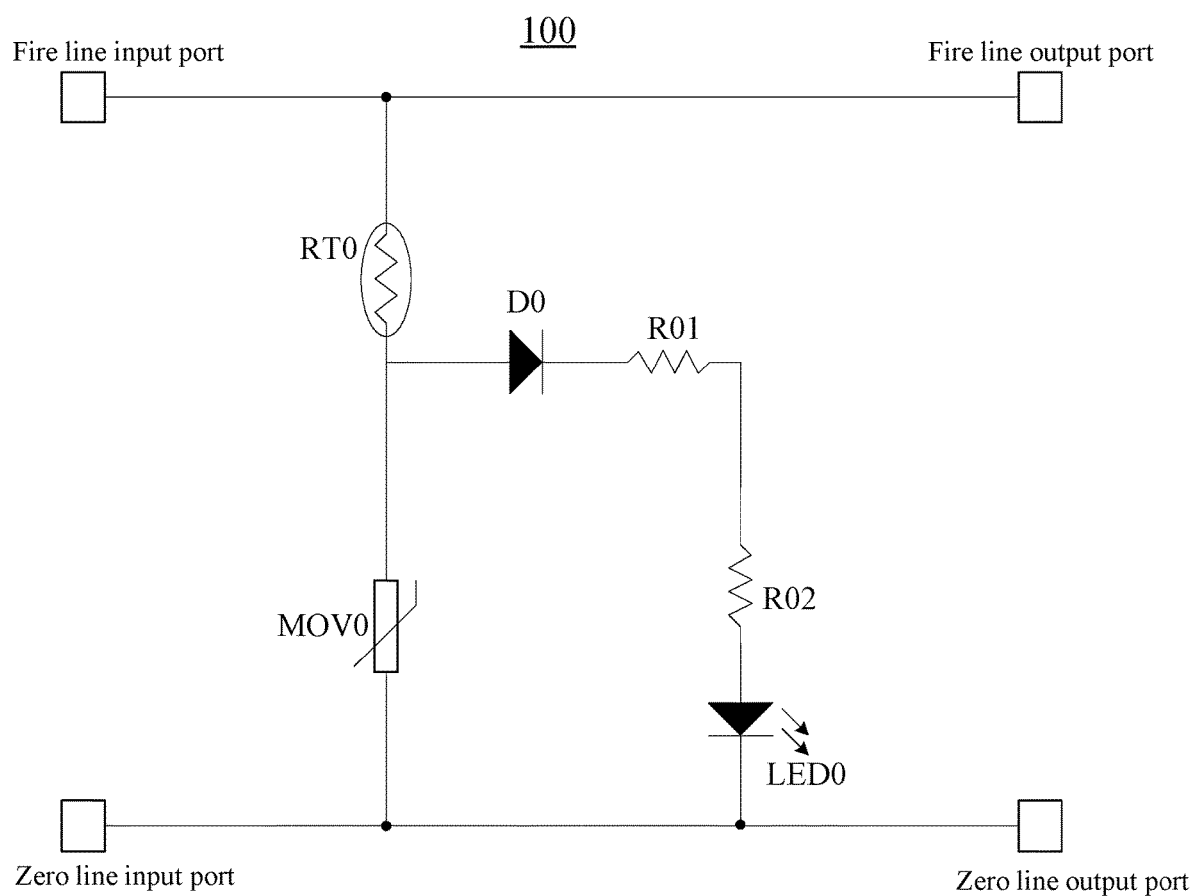
FIG. 1 is an exemplary circuit structure of an existing lightning protector.

First, a structure of an existing lightning protector is described with reference to FIG. 1. FIG. 1 is an exemplary circuit structure of an existing lightning protector 100. As shown in FIG. 1, the lightning protector 100 includes a thermal cutoff RT0 and a varistor MOV0. In addition, the lightning protector 100 includes a diode D0, a resistor R01, a resistor R02 and a lightning protection indicator LED0 connected in series. The operating status of the varistor MOV0 can be determined according to the indication of the lightning protection indicator.

As shown in FIG. 1, the thermal cutoff RT0 and the varistor MOV0 are connected in series between a fire wire input port (e.g., a live input port, a hot input port, an active input port) and a zero wire input port (e.g., a neutral input port). When the fire line input port and the zero line input port input normal voltage, the varistor MOV0 maintains a high resistance state for normal transmission of electrical energy to the power equipment. When a transient surge input from the fire line input port and zero line input port and reach a voltage threshold of the varistor MOV0, the varistor MOV0 changes to a low resistance state, and electrical energy will be released from the fire line input port to the zero line input port through the thermal cutoff, which will clamp the input voltage to a normal range and protect the safety of the circuit and the power equipment RT0.

The structure of the lightning protector 100 shown in FIG. 1 is simple and includes only one level of lightning protection structure, and response sensitivity of the lightning protection is low. For example, when the thermal fuse RT0 fuses due to a strong surge at the fire wire input port and zero wire input port, the lightning protector 100 loses its lightning protection and its own structure is damaged.

To solve this problem, this application provides a surge protection circuit, which could provide different levels of surge protection for different levels of surge and could greatly enhance the sensitivity of lightning protection. The application will be described in detail in conjunction with FIG. 2 to FIG. 10.

Figure 2:
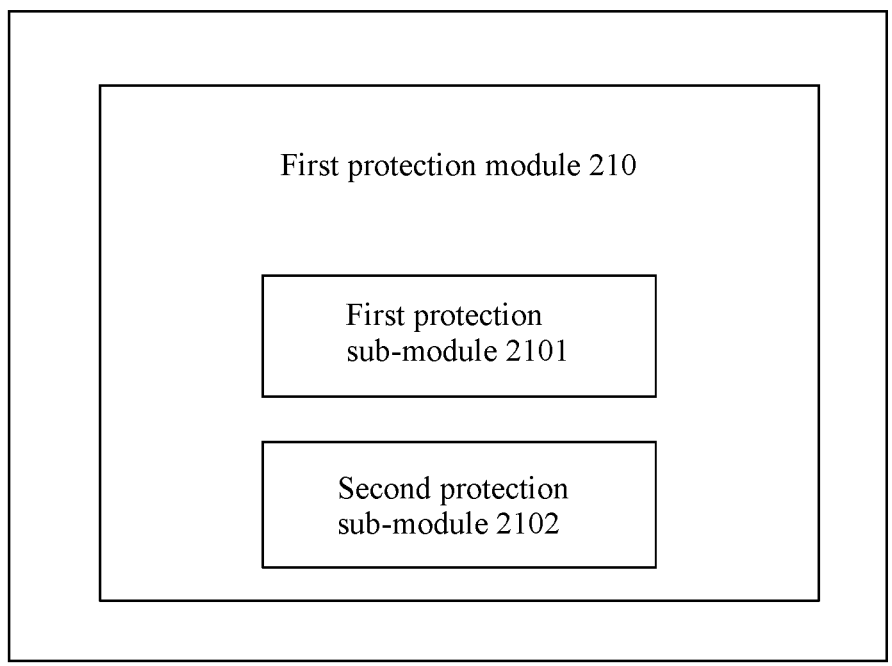
FIG. 2 is a schematic structure of a surge protection circuit according to an embodiment of the present application.

FIG. 2 is a schematic structure of a surge protection circuit 200 according to an embodiment of the present application. As shown in FIG. 2, the surge protection circuit 200 includes a first protection module 210, the first protection module 210 includes a first protection sub-module 2101 and a second protection sub-module 2102 electrically connected to the first protection sub-module 2101. The first protection sub-module 2101 is used for surge protection at the first surge input, the second protection sub-module 2102 is used at the second surge input for surge protection, the strength of the second surge is higher than the strength of the first surge.

In this embodiment, the surge protection circuit 200 has a two-level of protection which is constructed by a first protection sub-module 2101 and a second protection sub-module 2102. The first protection sub-module 2101 and the second protection sub-module 2102 each provide lightning protection for different levels (different strengths) of surge input, which can greatly improve the lightning protection sensitivity compared to the primary lightning protection structure shown in FIG. 1.

Figure 3:
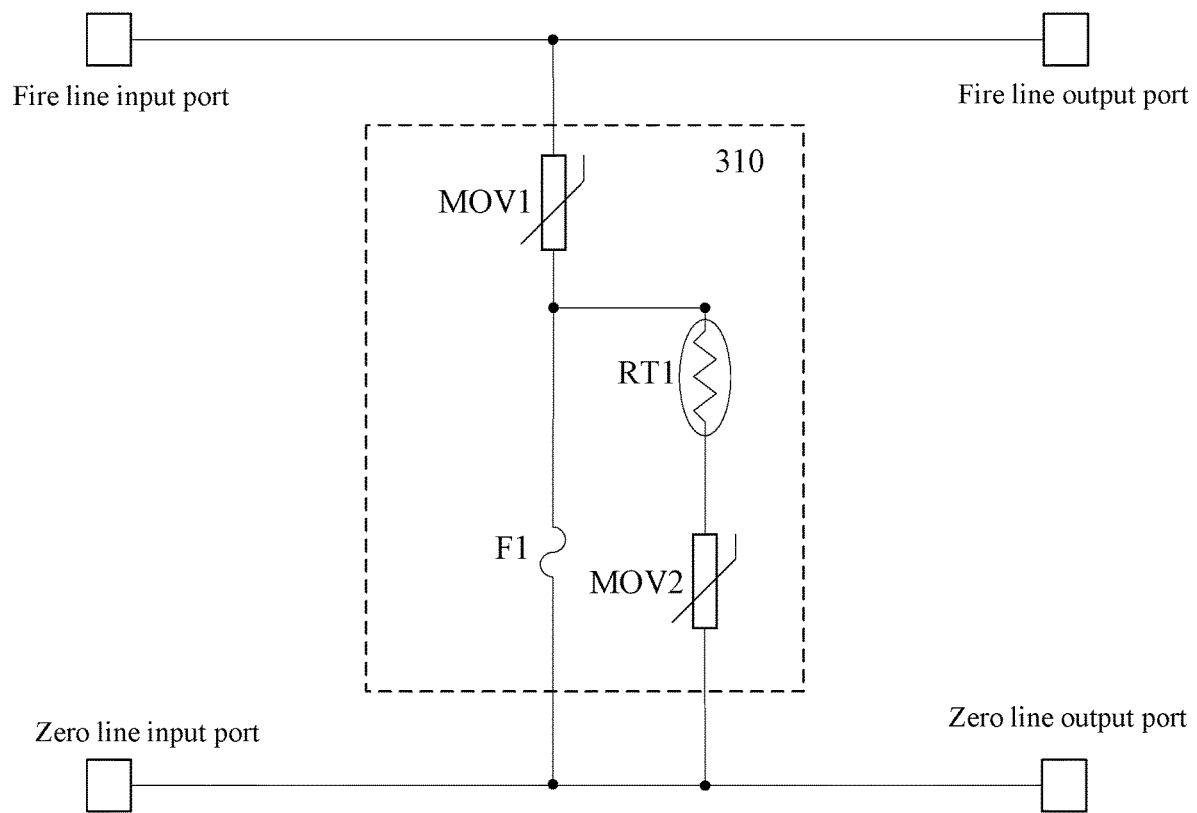
FIG. 3 is an exemplary circuit structure of a surge protection circuit according to an embodiment of the present application.

An exemplary circuit structure of a surge protection circuit 300 according to an embodiment of the present application, which can be used to implement the aforementioned surge protection circuit 200, is described below in connection with FIG. 3. As shown in FIG. 3, the surge protection circuit 300 includes a first protection module 310, the first protection module 310 includes a first protection sub-module and a second protection sub-module, wherein: the first protection sub-module is used for lightning protection during the first surge input, the second protection sub-module is used for lightning protection during the second surge input, the strength of the second surge is higher than the strength of the first surge. In FIG. 3, the surge protection circuit 300 is connected between the fire wire input port and the zero wire input port, but it should be understood that this is only exemplary and that the surge protection circuit 300 according to embodiments of the present application may also be used in other suitable situations.

Further, the first protection sub-module includes a first varistor MOV1, the second protection sub-module includes a thermal cutoff RT1 and a second varistor MOV2 connected in series with each other. In addition, the first protection module 310 also includes a switching sub-module, illustrated in FIG. 3 as a current fuse F1.

In the embodiment of this application, the surge protection circuit 300 has a two-level of protection which is constructed by a first protection sub-module and a second protection sub-module. The first protection sub-module and the second protection sub-module each provide lightning protection for different levels (different strengths) of surge input, which can greatly increase the sensitivity of lightning protection. In this application embodiment, the surge protection circuit 300 works as follows. When the normal voltage is input to the fire line input port and the zero line input port, the first varistor MOV1 maintains a high resistance state, so that electrical energy could be transmitted through the fire line output port and the zero line output port to the power-using equipment. When a transient surge (the first surge) is input from the fire line input port and the zero line input port and reaches the voltage threshold of the first varistor MOV1, the first varistor MOV1 changes to a low resistance, and electrical energy will be released from the fire line input port to the current fuse F1 to clamp the input voltage to a normal range. Then the first level of lightning protection against surges is started to protect the back-end circuit and the safety of electrical equipment. When a continuous or a strong surge (second surge) is input from the fire line input port to the zero line input port, the switching sub-module (i.e. the current fuse F1) fuses and changes to a high resistance state. The first varistor MOV1 and the second varistor MOV2 in series to form a lightning protection, the voltage at both ends of the first protection module 310 is clamped at a higher voltage, the circuit enters the second level of lightning and surge protection.

In the above embodiment, the role of the switching sub-module is to switch the lightning protection operation from the first protection sub-module to the second protection sub-module when the second surge input. In addition to being implemented as the aforementioned current fuse, the switching sub-module can also employ any other device or structure that may serve this purpose. In addition, the switching sub-module and the second protection sub-module are connected in parallel, after the switching sub-module switches the lightning protection operation from the first protection sub-module to the second protection sub-module, the first protection sub-module is connected in series with the second protection sub-module so that the first varistor MOV1 in the first protection sub-module and the second varistor MOV2 in the second protection sub-module are connected in series together for lightning protection.

Based on the above description, the surge protection circuit 300 according to this application embodiment for different levels of surge has different levels of lightning protection, which can greatly enhance the sensitivity of lightning protection.

Figure 4:
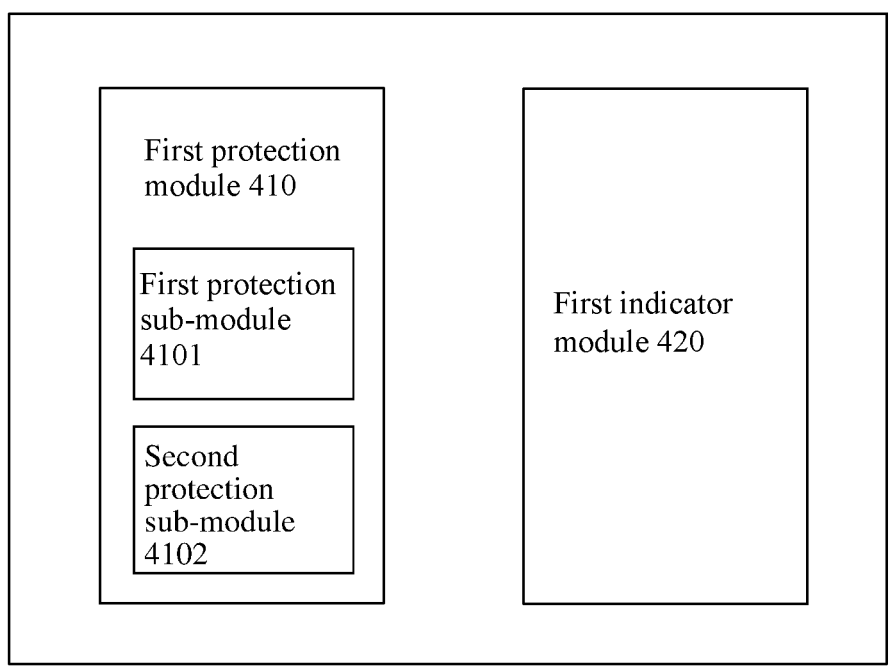
FIG. 4 is a schematic structure of a surge protection circuit according to another embodiment of the present application.

FIG. 4 is a schematic structure of a surge protection circuit according to another embodiment of the present application. As shown in FIG. 4, the surge protection circuit 400 includes a first protection module 410, the first protection module 410 includes a first protection sub-module 4101 and a second protection sub-module 4102 electrically connected to the first protection sub-module 4101. The first protection sub-module 4101 is used for surge protection at the first surge input, the second protection sub-module 4102 is used at the second surge input for surge protection, the strength of the second surge is higher than the strength of the first surge. In addition, the surge protection circuit 400 also includes a first indicator module 420 used for indicating the operating status of the first protection module 410.

In this embodiment, the surge protection circuit 400 has a two-level of protection which is constructed by a first protection sub-module 4101 and a second protection sub-module 4102. The first protection sub-module 4101 and the second protection sub-module 4102 each provide lightning protection for different levels (different strengths) of surge input, which can greatly increase the sensitivity of lightning protection. In addition, the surge protection circuit 400 has a first indicator module 420 indicating the working status of the first protection module 410, can clearly present the working status of the first protection module 410, more conducive to indicating the work of lightning protection.

Figure 5:
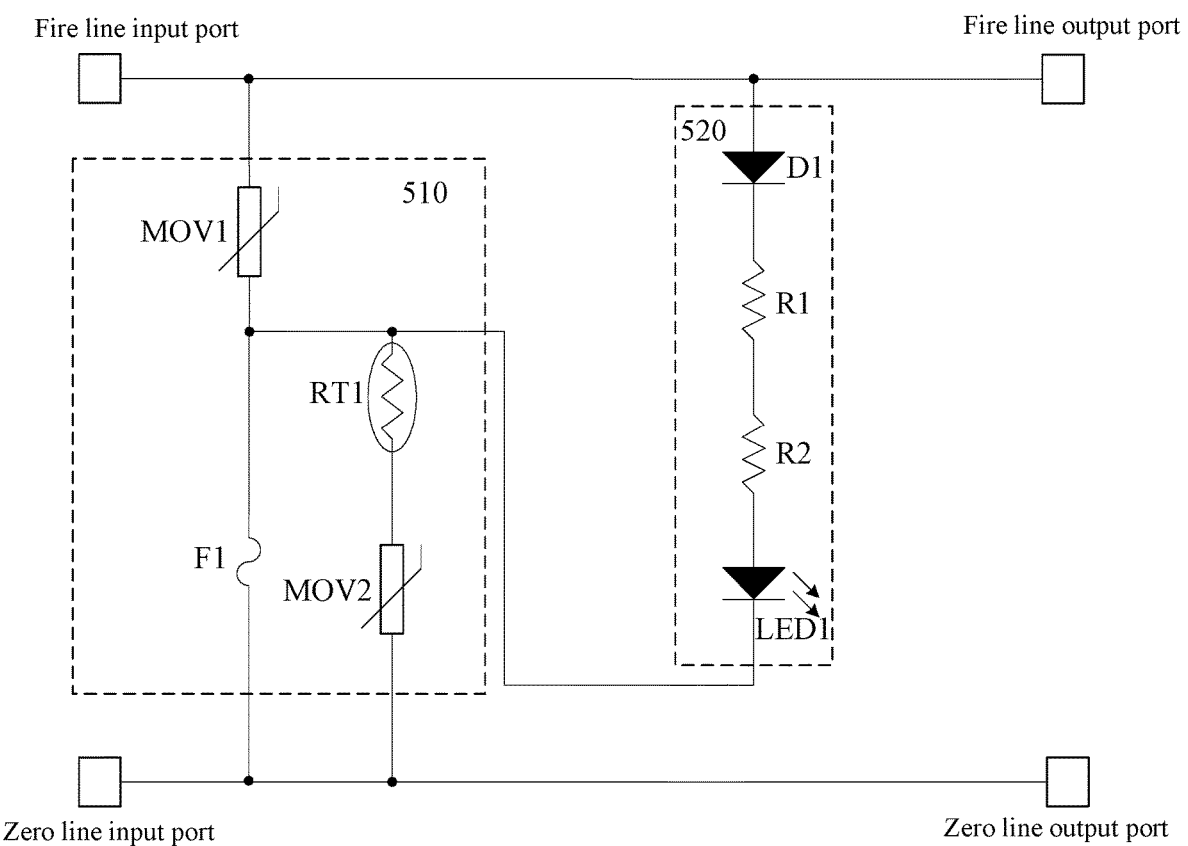
FIG. 5 is an exemplary circuit structure of a surge protection circuit according to another embodiment of the present application.

An exemplary circuit structure of a surge protection circuit 500 according to an embodiment of the present application, which can be used to implement the aforementioned surge protection circuit 400, is described below in connection with FIG. 5. As shown in FIG. 5, the surge protection circuit 500 includes a first protection module 510, the first protection module 510 includes a first protection sub-module and a second protection sub-module, wherein: the first protection sub-module is used for lightning protection during the first surge input, the second protection sub-module is used for lightning protection during the second surge input, the strength of the second surge is higher than the strength of the first surge. In addition, the surge protection circuit 500 also includes a first indication module 520. The first indication module 520 is used to indicate the operating status of the first protection module 510. In FIG. 5, the surge protection circuit 500 is connected between the fire wire input port and the zero wire input port, but it should be understood that this is only exemplary and that the surge protection circuit 500 according to embodiments of the present application may also be used in other suitable situations.

Further, the first protection sub-module includes a first varistor MOV1, the second protection sub-module includes a thermal cutoff RT1 and a second varistor MOV2 connected in series with each other. In addition, the first protection module 510 also includes a switching sub-module, illustrated in FIG. 5 as a current fuse F1. The first indication module 520 includes a first diode D1, a first resistor R1, a second resistor R2, and a first indicator device LED1. In the embodiment of the present application, the first indicator device LED1 is shown as a light emitting diode. It should be understood that the first indicator device can also be other light-emitting devices. In addition, the first indicator device can also be replaced by other devices with the role of indication, such as the indication device can be issued a different sound.

In the embodiment of this application, the surge protection circuit 500 has a two-level of protection which is constructed by a first protection sub-module and a second protection sub-module. The first protection sub-module and the second protection sub-module each provide lightning protection for different levels (different strengths) of surge input, which can greatly increase the sensitivity of lightning protection. In this application embodiment, the surge protection circuit 500 works as follows. When the normal voltage is input to the fire line input port and the zero line input port, the first varistor MOV1 maintains a high resistance state, so that electrical energy could be transmitted through the fire line output port and the zero line output port to the power-using equipment. When a transient surge (the first surge) is input from the fire line input port and the zero line input port and reaches the voltage threshold of the first varistor MOV1, the first varistor MOV1 changes to a low resistance, and electrical energy will be released from the fire line input port to the current fuse F1 to clamp the input voltage to a normal range. Then the first level of lightning protection against surges is started to protect the back-end circuit and the safety of electrical equipment. When a continuous or a strong surge (second surge) is input from the fire line input port to the zero line input port, the switching sub-module (i.e. the current fuse F1) fuses and changes to a high resistance state. The first varistor MOV1 and second varistor MOV2 in series to form a lightning protection, the voltage at both ends of the first protection module 510 is clamped at a higher voltage, the circuit enters the second level of lightning and surge protection.

Based on the above description, the surge protection circuit 500 according to this application embodiment for different levels of surge has different levels of lightning protection, which can greatly enhance the sensitivity of lightning protection. In addition, the surge protection circuit 500 according to the present application embodiment has a first indicator module 520 indicating the working status of the first protection module 510, can clearly present the working status of the first protection module 510, more conducive to indicating the work of lightning protection.

Figure 6:
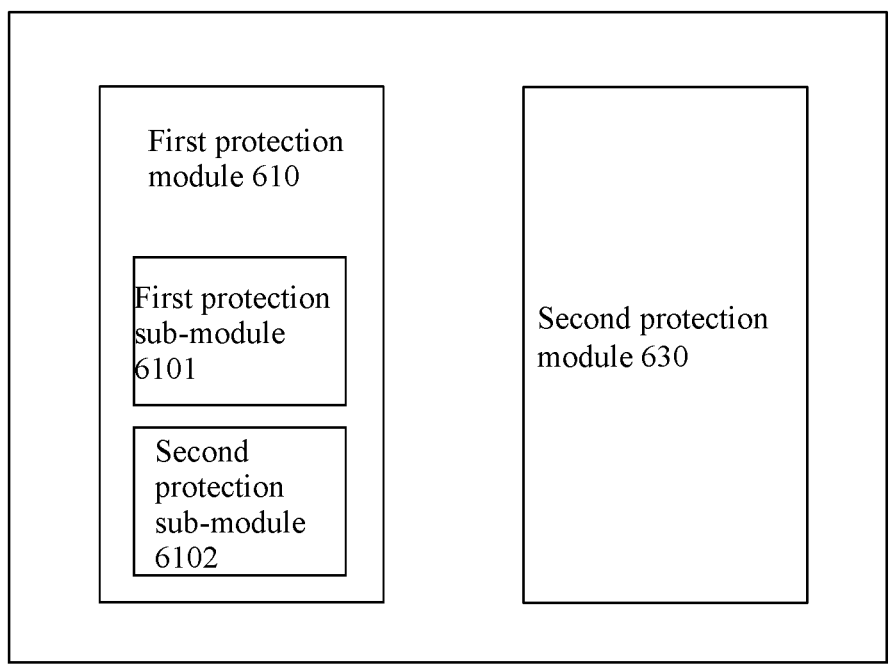
FIG. 6 is a schematic structure of a surge protection circuit according to a further embodiment of the present application.

FIG. 6 is a schematic structure of a surge protection circuit according to a further embodiment of the present application. As shown in FIG. 6, the surge protection circuit 600 includes a first protection module 610, the first protection module 610 includes a first protection sub-module 6101 and a second protection sub-module 6102 electrically connected to the first protection sub-module 6101. The first protection sub-module 6101 is used for surge protection at the first surge input, the second protection sub-module 6102 is used at the second surge input for surge protection, the strength of the second surge is higher than the strength of the first surge. In addition, the surge protection circuit 600 also includes a second protection module 630 used to protect the surge protection circuit 600 and the electrical equipment connected to the surge protection circuit 600 when the second protection sub-module 6102 performs lightning protection.

In this application embodiment, the surge protection circuit 600 has a first protection module 610, the first protection module 610 has a two-level of protection which is constructed by a first protection sub-module 6101 and a second protection sub-module 6102. The first protection sub-module 6101 and the second protection sub-module 6102 each provide lightning protection for different levels (different strengths) of surge input, which can greatly increase the sensitivity of lightning protection. In addition, the surge protection circuit 600 also has a second protection module 630, the second protection module 630 can not only protect electrical equipment connected to the surge protection circuit 600, but also protect the surge protection circuit 600 itself, further improving the reliability of lightning protection.

Figure 7:
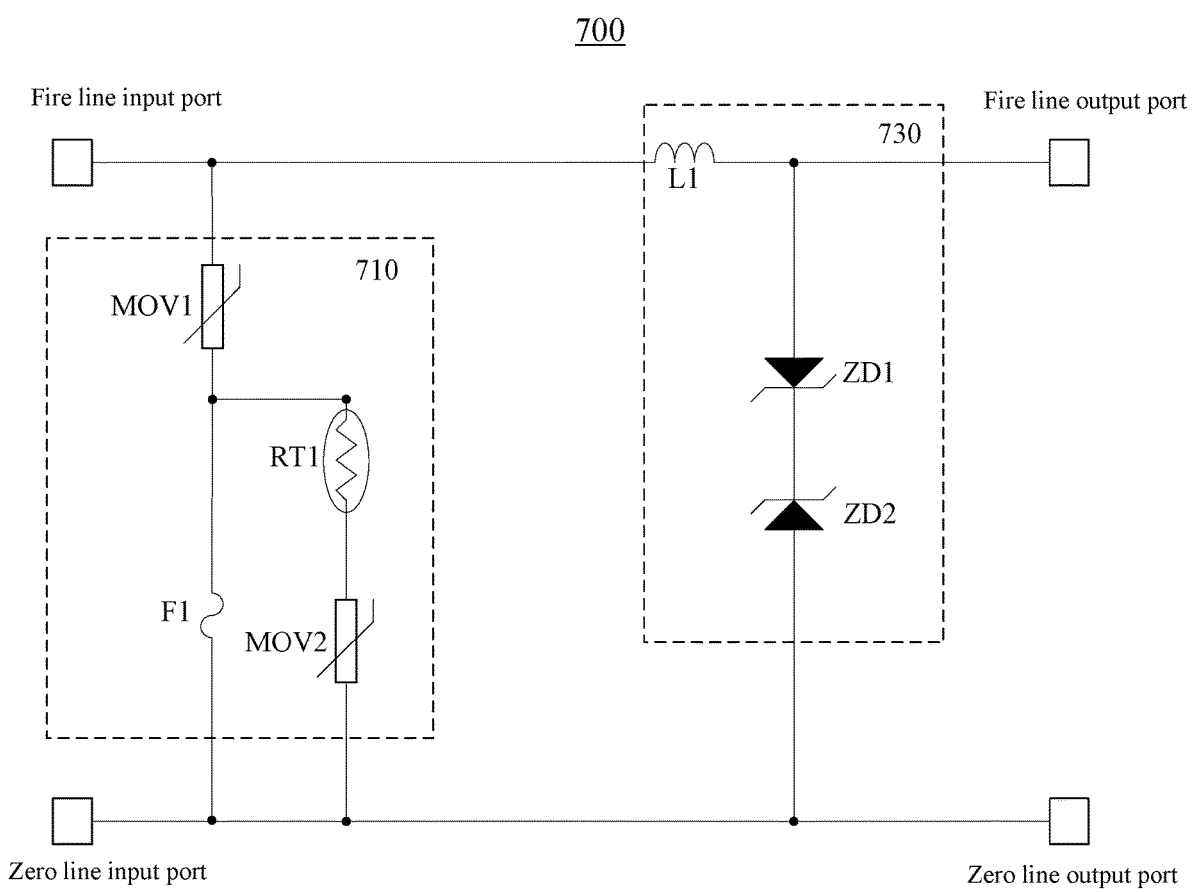
FIG. 7 is an exemplary circuit structure of a surge protection circuit according to a further embodiment of the present application.

An exemplary circuit structure of a surge protection circuit 700 according to an embodiment of the present application, which can be used to implement the aforementioned surge protection circuit 600, is described below in connection with FIG. 7. As shown in FIG. 7, the surge protection circuit 300 includes a first protection module 710, the first protection module 710 includes a first protection sub-module and a second protection sub-module, wherein: the first protection sub-module is used for lightning protection during the first surge input, the second protection sub-module is used for lightning protection during the second surge input, the strength of the second surge is higher than the strength of the first surge. In addition, the surge protection circuit 700 also includes a second protection module 730. The second protection module 730 is used to protect the surge protection circuit 700 and the power-using equipment connected to the surge protection circuit 700 while the second protection sub-module performs lightning protection.

Further, the first protection sub-module includes a first varistor MOV1, the second protection sub-module includes a thermal cutoff RT1 and a second varistor MOV2 connected in series with each other. In addition, the first protection module 310 also includes a switching sub-module, illustrated in FIG. 5 as a current fuse F1. The second protection module 730 includes with inductor L1, which can be connected in series with the first protection sub-module. In addition, the second protection module may also include a clamping sub-module connected to the inductor L1. In one example, the clamping sub-module may include at least one voltage regulator diode or transient diode. In another example, the clamping sub-module may be implemented as a bidirectional transient diode comprising a first diode ZD1 and a second diode ZD2 connected in series with each other. The first diode ZD1 may be a regulated diode or a transient diode, and the second diode ZD2 may be a regulated diode or a transient diode.

In this application embodiment, the surge protection circuit 700 has a first protection module 710, the first protection module 710 has two levels of protection sub-module, respectively, the first protection sub-module and the second protection sub-module. The first protection sub-module and the second protection sub-module each provide lightning protection for different levels (different strengths) of surge input, which can greatly increase the sensitivity of lightning protection. In addition, the surge protection circuit 700 has a second protection module 730, not only to the surge protection circuit 700 connected to the electrical equipment for lightning protection, but also to protect the surge protection circuit 700 itself, further improving the reliability of lightning protection. In this application embodiment, the surge protection circuit 700 works as follows. When the normal voltage is input to the fire line input port and the zero line input port, the first varistor MOV1 maintains a high resistance state, so that electrical energy could be transmitted through the fire line output port and the zero line output port to the power-using equipment. When a transient surge (the first surge) is input from the fire line input port and the zero line input port and reaches the voltage threshold of the first varistor MOV1, the first varistor MOV1 changes to a low resistance, and electrical energy will be released from the fire line input port to the current fuse F1 to clamp the input voltage to a normal range. Then the first level of lightning protection against surges is started to protect the back-end circuit and the safety of electrical equipment. When continuous or a strong surge (second surge) is input from the fire line input port to the zero line input port, the switching sub-module (i.e. the current fuse F1) fuses and changes to a high resistance state. The first varistor MOV1 and the second varistor MOV2 in series to form a lightning protection, the voltage at both ends of the first protection module 510 is clamped at a higher voltage, the circuit enters the second level of lightning and surge protection. At the same time, part of the surge flow through the second protection module 730 inductor L1 to reach the two-way transient diode, the two-way transient diode rapidly discharges current clamping voltage and forms pressure difference before and after the inductor L1. The first varistor MOV1 and the second varistor MOV2 connected in series to form a first lightning protection (the first lightning protection further including a two-level lightning protection), two-way transient diode and inductor L1 connected to form the second lightning protection to limit and clamp surges and enhance the lightning protection energy, and to protect the surge protection circuit and the power equipment at the same time. At the same time, two-way transient diode can be clamped at a lower voltage than the first varistor MOV1 and the second varistor MOV2. Since the inductor allows DC and blocks AC, it is possible to clamp the output voltage more safely at a lower voltage through the two-level protection circuit even under a strong surge input.

In the above embodiments, the second protection module 730 is shown as including inductor L1, first diode ZD1 and second diode ZD2, which is only exemplary. In other embodiment, the second protection module 730 may also be other structures, such as including only the inductor L1, or only one of the diodes described above.

Based on the above description, the surge protection circuit 700 according to this application embodiment for different levels of surge has different levels of lightning protection, which can greatly enhance the sensitivity of lightning protection. In addition, the surge protection circuit 700 according to this embodiment includes a two-level lightning protection, which could enhance lightning protection energy. Not only the power equipment could be protected, but also the surge protection circuit itself could be protected.

Figure 8:
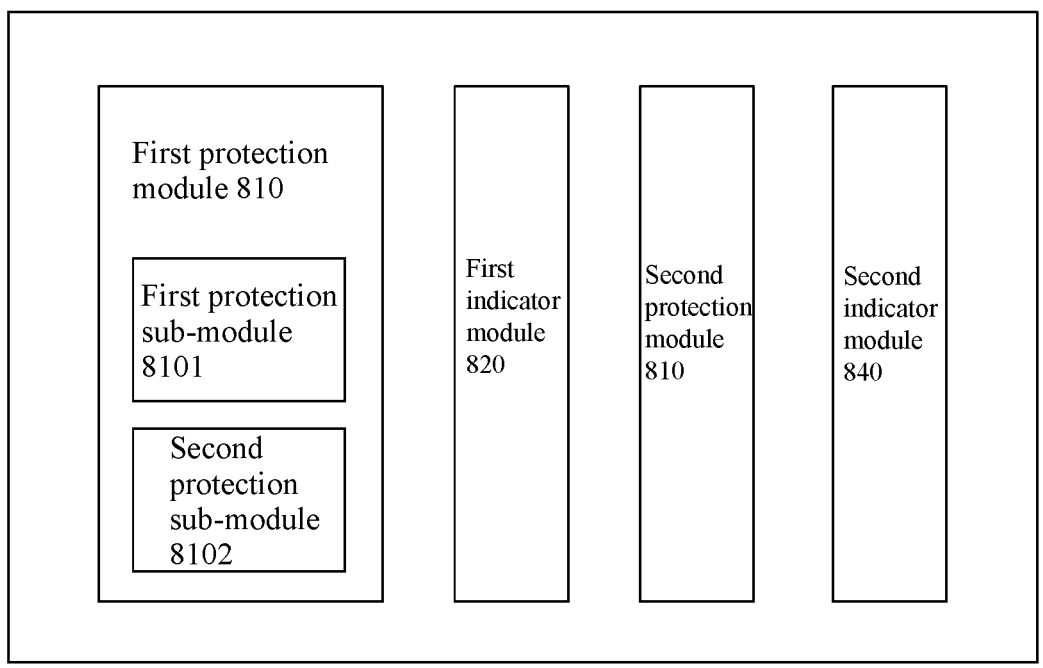
FIG. 8 is a schematic structure of a surge protection circuit according to yet another embodiment of the present application.

FIG. 8 is a schematic structure of a surge protection circuit according to a further embodiment of the present application. As shown in FIG. 8, the surge protection circuit 800 includes a first protection module 810, the first protection module 810 includes a first protection sub-module 8101 and a second protection sub-module 8102, wherein the first protection sub-module 8101 is used for lightning protection during the first surge input, the second protection sub-module 8102 is used for lightning protection during the second surge input, the strength of the second surge is higher than the strength of the first surge. In addition, the surge protection circuit 800 also includes a first indication module 820. The first indication module 820 is used to indicate the operating status of the first protection module 810. In addition, the surge protection circuit 800 also includes a second protection module 830, the second protection module 830 is used in the second protection sub-module 8102 for lightning protection while protecting the surge protection circuit 800 and the electrical equipment connected to the surge protection circuit 800. In addition, the surge protection circuit 800 also includes a second indication module 840. The first indication module 840 is used to indicate the operating status of the first protection module 830.

In this application embodiment, the surge protection circuit 800 has a first protection module 810, the first protection module 810 has a two-level of protection which is constructed by a first protection sub-module 8101 and a second protection sub-module 8102. The first protection sub-module 8101 and the second protection sub-module 8102 each provide lightning protection for different levels (different strengths) of surge input, which can greatly increase the sensitivity of lightning protection. In addition, the surge protection circuit 800 also has a second protection module 830, the second protection module 830 can not only protect electrical equipment connected to the surge protection circuit 800, but also protect the surge protection circuit 800 itself, further improving the reliability of lightning protection. Further, the surge protection circuit 800 has a first indicator module 820 indicating the operating status of the first protection module 810, and a second indicator module 840 indicating the operating status of the second protection module 830, can clearly present the operating status of the first protection module 810 and the second protection module 830, more conducive to indicating the work of lightning protection.

Figure 9:
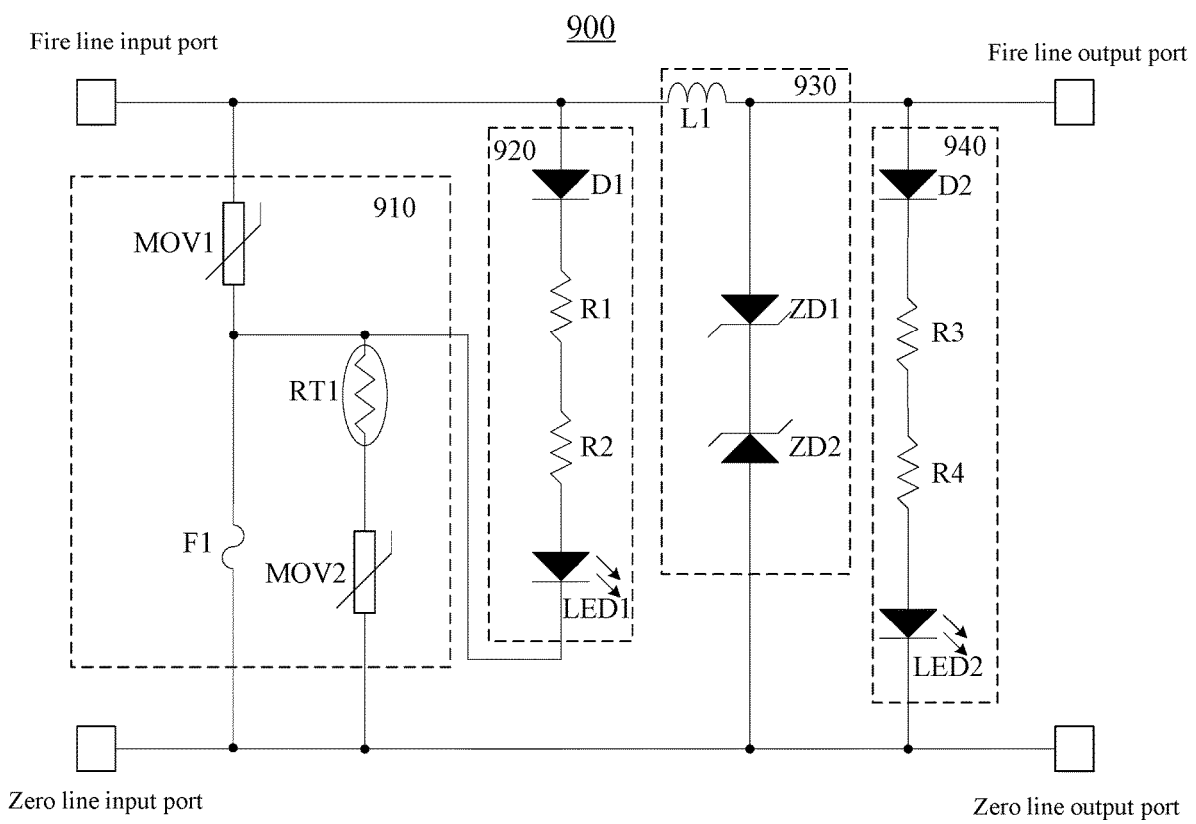
FIG. 9 is an exemplary circuit structure of a surge protection circuit according to another embodiment of the present application.

An exemplary circuit structure of the surge protection circuit 900 according to a further embodiment of the present application, which can be used to implement the aforementioned surge protection circuit 800, is described below in connection with FIG. 9. As shown in FIG. 9, the surge protection circuit 300 includes a first protection module 910, the first protection module 910 includes a first protection sub-module and a second protection sub-module, wherein: the first protection sub-module is used for lightning protection during the first surge input, the second protection sub-module is used for lightning protection during the second surge input, the strength of the second surge is higher than the strength of the first surge. In addition, the surge protection circuit 900 also includes a first indication module 920. The first indication module 920 is used to indicate the operating status of the first protection module 910. In addition, the surge protection circuit 900 also includes a second protection module 930. The second protection module 930 is used to protect the surge protection circuit 900 and the power-using equipment connected to the surge protection circuit 900 while the second protection sub-module performs lightning protection. In addition, the surge protection circuit 900 also includes a second indication module 940. The first indication module 940 is used to indicate the operating status of the first protection module 930.

Further, the first protection sub-module comprises a first varistor MOV1 and a current fuse F1 connected in series with each other between the fire wire input port and the zero wire input port. The second protection sub-module comprises a first varistor MOV1, a current fuse F1, a thermal fuse RT1 and a second varistor MOV2, the thermal fuse RT1 and the second varistor MOV2 are connected in series with each other and then in parallel with current fuse F1. In an embodiment, the current fuse F1 can be a current fuse and the thermal fuse RT1 can be a thermal fuse. The first indication module 920 includes a first diode D1, a first resistor R1, a second resistor R2, and a first indicator device LED1 connected in series with each other between the fire wire input port and the zero wire input port. The second protection module 930 includes an inductor L1 connected between the fire wire input port and the fire wire output port, and a two-way transient diode connected between the inductor L1 and the zero wire input port. In one example, the bidirectional transient diode may include a first diode ZD1 and a second diode ZD2 connected in series with each other. The second indication module 940 includes a second diode D2, a third resistor R3, a fourth resistor R4, and a second indicator device LED2 connected in series with each other between the fire wire input port and the zero wire input port. In the present embodiment, the first indicator device LED1 and the second indicator device LED2 are light emitting diodes. It should be understood that the first indicator device and the second indicator device can also be other light-emitting devices. In addition, the first indicator device and the second indicator device can also be replaced by other devices that have an indication role, such as the indication device can emit different sounds.

In this application embodiment, the surge protection circuit 900 has a first protection module 910, the first protection module 910 has two levels of protection sub-module, respectively, the first protection sub-module and the second protection sub-module. The first protection sub-module and the second protection sub-module each provide lightning protection for different levels (different strengths) of surge input, which can greatly increase the sensitivity of lightning protection. In addition, the surge protection circuit 900 has a second protection module 930, not only to the surge protection circuit 900 connected to the electrical equipment for lightning protection, but also to protect the surge protection circuit 900 itself, further improving the reliability of lightning protection. Further, the surge protection circuit 900 has a first indicator module 920 indicating the operating status of the first protection module 910, and a second indicator module 940 indicating the operating status of the second protection module 930, can clearly present the operating status of the first protection module 910 and the second protection module 930, more conducive to indicating the work of lightning protection.

In this application embodiment, the surge protection circuit 900 works as follows. When the normal voltage is input to the fire line input port and the zero line input port, the first varistor MOV1 maintains a high resistance state, so that electrical energy could be transmitted through the fire line output port and the zero line output port to the power-using equipment. When a transient surge (the first surge) is input from the fire line input port and the zero line input port and reaches the voltage threshold of the first varistor MOV1, the first varistor MOV1 changes to a low resistance, and electrical energy will be released from the fire line input port to the current fuse F1 to clamp the input voltage to a normal range. Then the first level of lightning protection against surges is started to protect the back-end circuit and the safety of electrical equipment. When continuous or a strong surge (second surge) is input from the fire line input port to the zero line input port, the switching sub-module (i.e. the current fuse F1) fuses and changes to a high resistance state. The first varistor MOV1 and the second varistor MOV2 in series to form a lightning protection, the voltage at both ends of the first protection module 510 is clamped at a higher voltage, the circuit enters the second level of lightning and surge protection. At the same time, part of the surge flow through the second protection module 930 inductor L1 to reach the two-way transient diode, the two-way transient diode rapidly discharges current clamping voltage and forms pressure difference before and after the inductor L1. The first varistor MOV1 and the second varistor MOV2 connected in series to form a first lightning protection (the first lightning protection further including a two-level lightning protection), two-way transient diode and inductor L1 connected to form the second lightning protection to limit and clamp surges and enhance the lightning protection energy, and to protect the surge protection circuit and the power equipment at the same time.

Based on the above description, the surge protection circuit 900 according to this application embodiment for different levels of surge has different levels of lightning protection, which can greatly enhance the sensitivity of lightning protection. In addition, the surge protection circuit 900 according to this embodiment includes a two-level lightning protection, which could enhance lightning protection energy. Not only the power equipment could be protected, but also the surge protection circuit itself could be protected. In addition, the surge protection circuit 900 according to this embodiment has a first indication module 920 indicating the operating status of the first protection module 910, and a second indication module 940 indicating the operating status of the second protection module 930. The first protection module 910 and the second protection module 930 can clearly present the operating status to indicate lightning protection.

Figure 10:
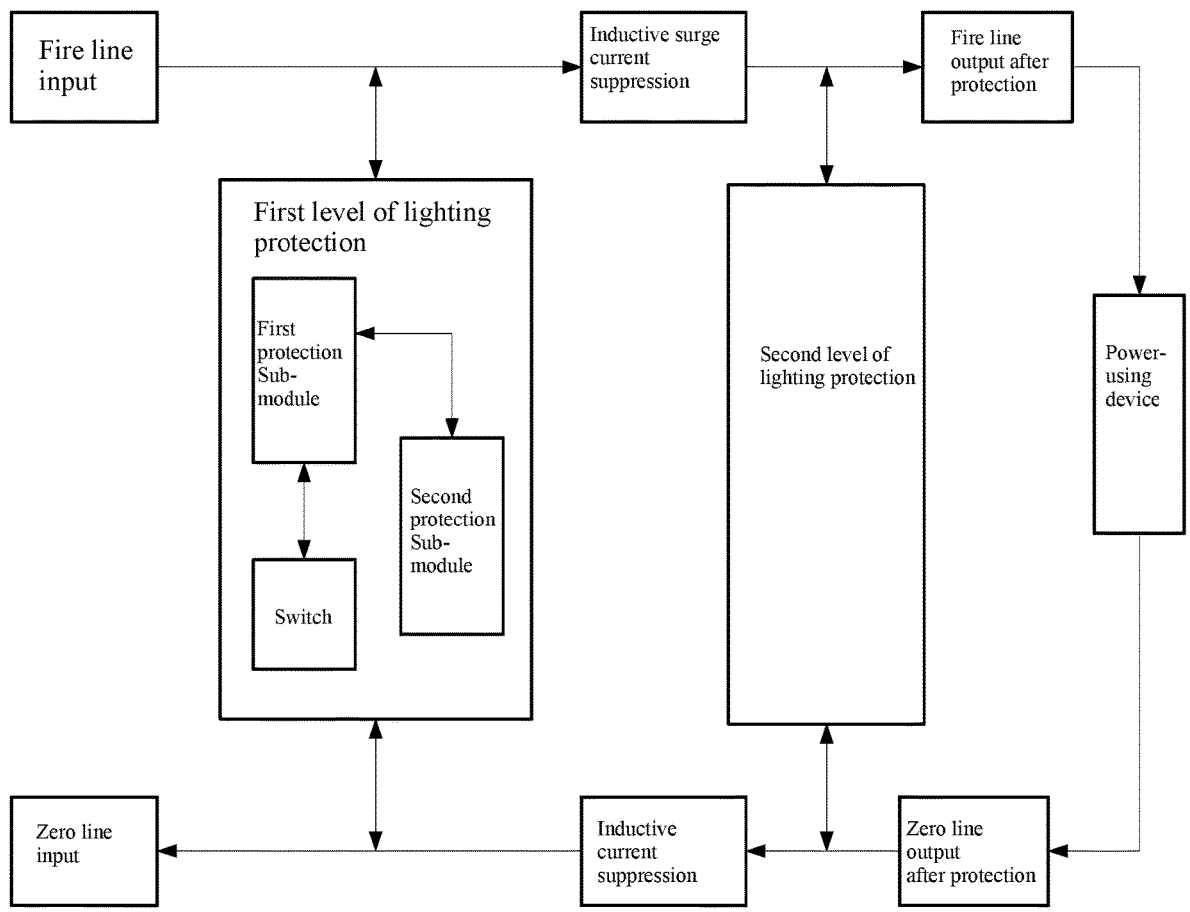
FIG. 10 is a working flowchart of a surge protection circuit according to an embodiment of the present application.

FIG. 10 is a working flowchart of a surge protection circuit according to an embodiment of the present application. As shown in FIG. 10, when a surge is input from the fire wire input port, the first level of lightning protection (first protection sub-module) or the second level of lightning protection (second protection sub-module) in the first lightning protection (first protection module) activates the lightning protection depending on the strength of the surge. When the surge strength is small, the first level of lightning protection is activated, and when the surge is large, the second level of lightning protection is activated. The two-level lightning protection can be switched between each other by a switch (e.g., the current fuse). When the second level of lightning protection is activated, if there is still a portion of the surge that has not been intercepted, a second level of lightning protection (second protection module) is activated. After lightning protection, a safe voltage is output to the power-using equipment. Thus, not only the sensitivity of lightning protection is greatly enhanced, the surge protection circuit itself could be protected as well as the protection of power-using equipment.

According to another aspect of the present application, a lightning protector is provided, which comprises a surge protection circuit according to an embodiment of the present application as described herein. A person skilled in the art can understand the structure of the surge protection circuit included in the lightning protector provided according to another aspect of the present application in conjunction with the preceding description, which will not be repeated here for the sake of brevity.

According to another aspect of the present application, an electronic device is provided, which includes the surge protection circuitry according to embodiments of the present application as previously described. The structure of the surge protection circuit included in the electronic device provided according to another aspect of the present application can be understood by those skilled in the art in conjunction with the preceding description and will not be repeated here for the sake of brevity. In one example, the electronic device can be a socket and the surge protection circuit is provided between a power input port and a power output port.

Based on the above description, the surge protection circuit, the lightning protector, and the electronic device could provide different levels of surge protection for different levels of surge and could greatly enhance the sensitivity of lightning protection. In addition, the surge protection circuit, lightning protection and electronic device include a two-level lightning protection. Not only the power equipment could be protected, but also the surge protection circuit itself could be protected.

Although example embodiments have been described herein with reference to the accompanying drawings, it should be understood that the above example embodiments are merely exemplary and are not intended to limit the scope of the present application thereto. Various changes and modifications can be made therein by a person of ordinary skill in the art without departing from the scope and spirit of this application. All such changes and modifications are intended to be included within the scope of the present application as claimed in the appended claims.

One of ordinary skill in the art can realize that the units and algorithmic steps of each example described in conjunction with the embodiments disclosed herein can be implemented with electronic hardware, or a combination of computer software and electronic hardware. Whether these functions are performed in hardware or software depends on the specific application and design constraints of the technology solution. A skilled professional may use different methods for each particular application to achieve the described functionality, but such an implementation should not be considered outside the scope of this application.

In the several embodiments provided in this application, it should be understood that the disclosed apparatus and method, can be implemented in other ways. For example, the device embodiments described above are only schematic, for example, the division of the units described, only for a logical functional division, the actual implementation can have another division, for example, multiple units or components can be combined or can be integrated into another device, or some features can be ignored, or not implemented.

A large number of specific details are described in the instructions provided here. It can be understood, however, that embodiments of the present application can be practiced without these specific details. In some examples, the well-known methods, structures and techniques are not shown in detail so as not to obscure the understanding of this specification.

Similarly, it should be understood that in order to streamline the present application and aid in understanding one or more of the various aspects of the invention, the individual features of the present application are sometimes grouped together in individual embodiments, figures, or descriptions thereof in the description of exemplary embodiments of the present application. However, the method of this application should not be construed to reflect the intent that the claimed protection of this application requires more features than those expressly set forth in each claim. More precisely, as reflected in the corresponding claims, the point of invention is that the corresponding technical problem can be solved with fewer features than all the features of a particular disclosed single embodiment. Accordingly, the claims that follow a specific embodiment are thereby expressly incorporated into that specific embodiment, wherein each claim is itself treated as a separate embodiment of the present application.

It will be understood by those skilled in the art that any combination of all features disclosed in this specification (including the accompanying claims, summary and accompanying drawings) and all processes or units of any method or apparatus so disclosed may be employed, except that the features are mutually exclusive. Unless otherwise expressly stated, each feature disclosed in this specification (including the accompanying claims, summary and accompanying drawings) may be replaced by an alternative feature that provides the same, equivalent or similar purpose.

In addition, those of skill in the art will understand that although some embodiments described herein include some features included in other embodiments and not others, the combination of features of different embodiments means that they are within the scope of the present application and form different embodiments. For example, any one of the embodiments claimed for protection in the claims can be used in any combination.

The individual component embodiments of the present application can be implemented in hardware, or in software modules running on one or more processors, or in a combination thereof. It should be understood by those skilled in the art that a microprocessor or digital signal processor (DSP) may be used in practice to implement some or all of the functions of some of the modules according to embodiments of the present application. The present application may also be implemented as an apparatus program (e.g., a computer program and a computer program product) for performing some or all of the methods described herein. Such a program implementing the present application may be stored on a computer-readable medium or may have the form of one or more signals. Such a signal can be downloaded from an Internet site, or provided on a carrier signal, or in any other form.

It should be noted that the above embodiments illustrate the present application and do not limit it, and that a person skilled in the art may devise alternative embodiments without departing from the scope of the appended claims. Any reference symbols located between the brackets in the claim should not be constructed as a limitation of the claim. The word "comprising" does not exclude the presence of an element or step not listed in the claim. The word "one" or "one" before the component does not exclude the existence of multiple such components. This application can be implemented with the help of hardware including a number of different components and with the help of a computer appropriately programmed. In unit claims where several devices are listed, several of these devices may be specifically embodied by the same hardware item. The use of the words first, second, and third does not indicate any order. The words can be interpreted as names.

The above mentioned is only a specific implementation or a description of a specific implementation of this application. The scope of protection of this application is not limited to this, and any person skilled in the art can easily think of variations or substitutions within the technical scope disclosed in this application, which should be covered by the scope of protection of this application. The scope of protection of this application shall be subject to the scope of protection of the claims.

What is claimed is:

1. A surge protection circuit comprising:
a first protection circuit configured to respond to a first voltage surge above a first voltage threshold; and
a second protection circuit electrically connected to the first protection circuit; wherein:
the second protection circuit is configured to respond to a second voltage surge above a second voltage threshold,
the second voltage threshold is higher than the first voltage threshold,
the first protection circuit comprises a first varistor,
the second protection circuit comprises a thermal fuse and a second varistor, and
the first varistor and the second varistor are connected in series in response to the second voltage surge.

2. The surge protection circuit according to claim 1, wherein the first protection circuit further comprises:
a switch electrically connected to the second protection circuit.

3. The surge protection circuit according to claim 1, wherein the first protection circuit and the second protection circuit are connected in series.

4. The surge protection circuit according to claim 2, wherein the switch is connected in parallel with the second protection circuit.

5. The surge protection circuit according to claim 2, wherein the switch comprises:
a current fuse configured to melt based on receiving the second voltage surge above the second voltage threshold.

6. The surge protection circuit according to claim 1, wherein the thermal fuse and the second varistor are connected in series.

7. The surge protection circuit according to claim 1, further comprising:
a third protection circuit connected to the first protection circuit and the second protection circuit.

8. The surge protection circuit according to claim 7, wherein the third protection circuit comprises:
an inductor connected in series with the first protection circuit.

9. The surge protection circuit according to claim 7, wherein:
the third protection circuit comprises a first diode, and
the first diode is a voltage regulator diode or a transient diode.

10. The surge protection circuit according to claim 9, wherein:
the third protection circuit comprises a second diode,
the second diode is a voltage regulator diode or a transient diode, and
the first diode and the second diode form a bidirectional transient diode.

11. The surge protection circuit according to claim 1, further comprising:
an indication circuit configured to indicate an operating status of the first protection circuit or the second protection circuit.

12. The surge protection circuit according to claim 1, wherein the surge protection circuit is included in a lightning protector.

13. A surge protection circuit comprising:
a live wire port;
a neutral wire port;
a first protection circuit connected between the live wire port and the neutral wire port, wherein the first protection circuit comprises a first varistor and a current fuse; and
a second protection circuit connected between the live wire port and the neutral wire port, wherein:
the second protection circuit comprises a second varistor and a thermal fuse, and
the first protection circuit and the second protection circuit are connected in series.

14. The surge protection circuit according to claim 13, wherein the thermal fuse and the second varistor are connected in series.

15. The surge protection circuit according to claim 13, further comprising:
a third protection circuit connected to the first protection circuit and the second protection circuit.

16. The surge protection circuit according to claim 13, further comprising:
an indication circuit configured to indicate an operating status of the first protection circuit or the second protection circuit.

17. An electronic device comprising a surge protection circuit, wherein the surge protection circuit comprises:
a first protection circuit configured to respond to a first voltage surge above a first voltage threshold; and
a second protection circuit electrically connected to the first protection circuit, wherein:
the second protection circuit is configured to respond to a second voltage surge above a second voltage threshold,
the second voltage threshold is higher than the first voltage threshold,
the first protection circuit comprises a first varistor,
the second protection circuit comprises a thermal fuse and a second varistor, and
in response to the second voltage surge, the first varistor is connected in series with at least one of the thermal fuse or the second varistor.

18. The electronic device according to claim 17, wherein the electronic device is a socket, and the surge protection circuit is provided between a power input port and a power output port.

19. The electronic device according to claim 17, wherein the surge protection circuit comprises a third protection circuit connected to the first protection circuit and the second protection circuit.

20. The electronic device according to claim 17, wherein the electronic device comprises a lightning protector.

* * * * *